(12) United States Patent
Nakanishi et al.

(10) Patent No.: US 6,445,885 B2
(45) Date of Patent: Sep. 3, 2002

(54) STROBE DEVICE OF LENS-FITTED FILM UNIT AND PRODUCTION METHOD OF THE STROBE DEVICE

(75) Inventors: Hiromi Nakanishi; Ken Ishida; Kiyoaki Hazama; Hiroshi Yamaguchi; Kiyoshi Kanai, all of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/972,567

(22) Filed: Oct. 5, 2001

Related U.S. Application Data

(62) Division of application No. 09/437,463, filed on Nov. 10, 1999, now Pat. No. 6,337,953.

(30) Foreign Application Priority Data

Nov. 16, 1998 (JP) ............................................. 10-341184
Dec. 1, 1998 (JP) ............................................. 10-356911
Jun. 1, 1999 (JP) ............................................... 9-153612

(51) Int. Cl.[7] ................................................. G03B 15/05
(52) U.S. Cl. .............................. 396/176; 313/631; 362/3
(58) Field of Search .................................. 396/176, 155; 313/631, 632; 362/3

(56) References Cited

U.S. PATENT DOCUMENTS 3,304,456 A * 2/1967 DeLany et al. ............. 313/632
5,913,083 A * 6/1999 Allen .......................... 396/176

* cited by examiner

Primary Examiner—W. B. Perkey
(74) Attorney, Agent, or Firm—Bierman, Muserlian and Lucas

(57) ABSTRACT

A strobe device, including: a strobe circuit board; a connecting conductor composed of a wire member; and a strobe emitting portion which includes; a) a light emitting tube, having electrode terminals on its both ends, b) a reflector for reflecting strobe light emitted by the light emitting tube toward a photographic object and c) a transmission window for covering a front surface of the reflector and for transmitting the strobe light. In the strobe device, the connecting conductor has a contact with the light emitting tube and electricity is supplied to the light emitting tube through the connecting conductor.

6 Claims, 20 Drawing Sheets

STROBE DEVICE OF LENS-FITTED FILM UNIT AND PRODUCTION METHOD OF THE STROBE DEVICE

This Application is a Division of U.S. patent application Ser. No. 09/437,463, filed Nov. 10, 1999, now U.S. Pat. No. 6,337,953.

BACKGROUND OF THE INVENTION

The present invention relates to a strobe device of a lens-fitted film unit and a production method of the strobe device.

FIG. 14 is an illustration for explaining an attaching structure of a strobe light emitting tube of a light emission section unit in a strobe device assembled in the conventional lens-fitted film unit, and FIG. 14(a) is a plan view of a peripheral portion of a attaching portion of the strobe light emitting tube centering around the strobe light emitting tube of the strobe emission section unit, FIG. 14(b) is a partial engagement view of the left side of the strobe light emitting tube, and FIG. 14(c) is a view taken on line S—S arrowed in FIG. 14(b).

In FIG. 14, numeral 101 is a discharging tube receiver provided in the light emission section unit 107 having a surface which receives the strobe light emitting tube 102 composed of a xenon discharging tube by receiving surfaces 103 and 104 and holds, and receives the strobe light emitting tube 102 by positioning surfaces 105 and 106 and positions it.

The strobe light emitting tube 102 is pressed by a reflector 108 in the direction of the discharging tube receiver 101 such that the receiving surfaces 103 and 104 are expanded by the pressure. Accordingly, the strobe light emitting tube 102 and the reflector 108 are closely contacted with each other at the surface R as shown in FIG. 14.

Further, in the light emission section unit 107, strip-like contact pieces 111 and 112 which are electrically continued to discharge tube terminals 109 and 110 of the strobe light emitting tube 102, are provided, and both are structured so that they are soldered as shown by a soldered portion 113.

However, in the strobe device, for the dimension in the length direction including a attaching portion of the strobe light emitting tube 102, which determines the dimension in the length direction of the light emission section unit 107, a dimensional margin (t1+t2) in which the thickness t1 between the positioning surfaces 105, 106 and the end surface of the discharge tube receiver 101, is added to a gap t2 between the end surface of the discharge tube receiver 101 and contact pieces 111, 112, is absolutely necessary.

That is, generally, the discharge tube receiver 101 is a resin mold member, and for the thickness t1 of a portion of the discharge tube receiver 101, a predetermined dimension is necessary in its strength, and for the gap t2, a predetermined dimension is necessary so that the end portion of the discharge tube receiver 101 is not fused by the heat due to soldering.

Although, in order to reduce the size of the light emission section unit 107, it is necessary that the dimension in the length direction of the light emission section unit 107 is reduced as small as possible, there is a problem that the dimensional margin accompanied by providing the discharge tube receiver 101 prevents the reduction of the size.

Further, contact pieces 111 and 112 are strip-like members, and therefore, there is a problem that, not only the space is necessary, but also the material cost is increased, and further, these prevent the reduction of the size and cost.

SUMMARY OF THE INVENTION

Accordingly, an object of the present invention is to provide a strobe device by which reduction of the size can be easily carried out at low cost, and a production method of the strobe device.

Further, as another problem of the conventional strobe device, there is a problem that, at assembling of the strobe device, the trouble of polarity mis-installation to the light emitting tube unit of the light emitting tube such as a xenon lamp which has polarities of + and −, occurs.

Another object of the present invention is also to provide a strobe device by which the assembling which produces the polarity mis-installation, can be prevented.

In order to solve the above-described problem, an embodiment of the present invention is a strobe device, including: a strobe circuit board; a connecting conductor composed of a wire member; and a strobe emitting portion which includes; a) a light emitting tube, having electrode terminals on its both ends, b) a reflector for reflecting strobe light emitted by the light emitting tube toward a photographic object and c) a transmission window for covering a front surface of the reflector and for transmitting the strobe light in which the strobe device, the connecting conductor has a contact with the light emitting tube and electricity is supplied to the light emitting tube through the connecting conductor.

Further, in order to solve the above-described problem, an embodiment of the present invention is a strobe device which is assembled into a lens-fitted film unit in which unexposed film is previously loaded, which is characterized to have: a light emitting tube having electrode terminals on its both ends; a reflector to reflect the strobe light emitted by the light emitting tube toward a photographic object side; a transmission window which covers the front surface side of the reflector and transmits the strobe light; and a flash light emission device provided with a connecting conductor composed of a wire member which is connected to at least one electrode terminal of both end electrode terminals of the light emitting tube.

In order to solve the above-described problem, another embodiment of the present invention is a strobe device which is assembled into a lens-fitted film unit in which unexposed film is previously loaded, which is characterized to have: a light emitting tube having electrode terminals on its both ends; a reflector to reflect the strobe light emitted by the light emitting tube onto a photographic object side; a transmission window which covers the front surface side of the reflector and transmits the strobe light; a reflector cover member to cover the rear side of the reflector; and a trigger connecting conductor composed of a wire member to apply a trigger signal for light emission onto the light emitting tube, wherein a trigger connecting conductor is elastically contacted with the light emitting tube by holding the trigger connecting conductor with the light emitting tube and the reflector covering member.

Further, another embodiment of the present invention is as follows: a strobe device including a strobe circuit board provided with a switch conductive portion which turns on and off a strobe circuit by contacting with or separating from a main switch piece, which is characterized in that the length of both terminals of the light emitting tube of the strobe device is structured such that one terminal is longer than the other terminal, and the distance from a light emitting tube end edge of one terminal side to a connection receiving portion of one terminal side, is made to be a distance to which the other terminal can not reach.

According to this embodiment, the length of both terminals of the light emitting tube of the strobe device is structured such that the one terminal is longer than the other terminal, and the distance from a light emitting tube end edge of one terminal side to a connection receiving portion of one terminal side, is made to be a distance to which the other terminal can not reach, therefore, due to the difference of the length of both terminals, the polarity of the light emitting tube can be discriminated without making any marking, and assembling accompanied by mis-polarity of the light emitting tube can be prevented.

Further, in order to attain the above object, a lens-fitted film unit according to other embodiments of the present invention, is characterized in that it has a strobe circuit and a non-contact type trigger switch to make the strobe circuit emit the light.

According to the lens-fitted film unit of the present embodiment, because the trigger switch to make the strobe circuit emit the light is non-contact type, deformation due to careless operations which has a possibility to occur in the case of contact type or wear due to a long term use does not occur, and, accordingly, it is effective for re-use.

BRIEF DESCRIPTION OF THE DRAWINGS

FIGS. 14(a)–14(c) are illustrations for explaining the attaching structure of the strobe light emitting tube of the light emission section unit in the strobe device assembled in the conventional lens-fitted film unit, in which FIG. 14(a) is a front view of the periphery of the attaching portion of the strobe light emitting tube centering around the strobe light emitting tube of the light emission section unit, FIG. 14(b) is a partial enlargement view of the left side of the strobe light emitting tube, and FIG. 14(c) is a view taken on line S—S arrowed in FIG. 14(b).

DETAILED DESCRIPTION OF THE INVENTION

Figure 1:
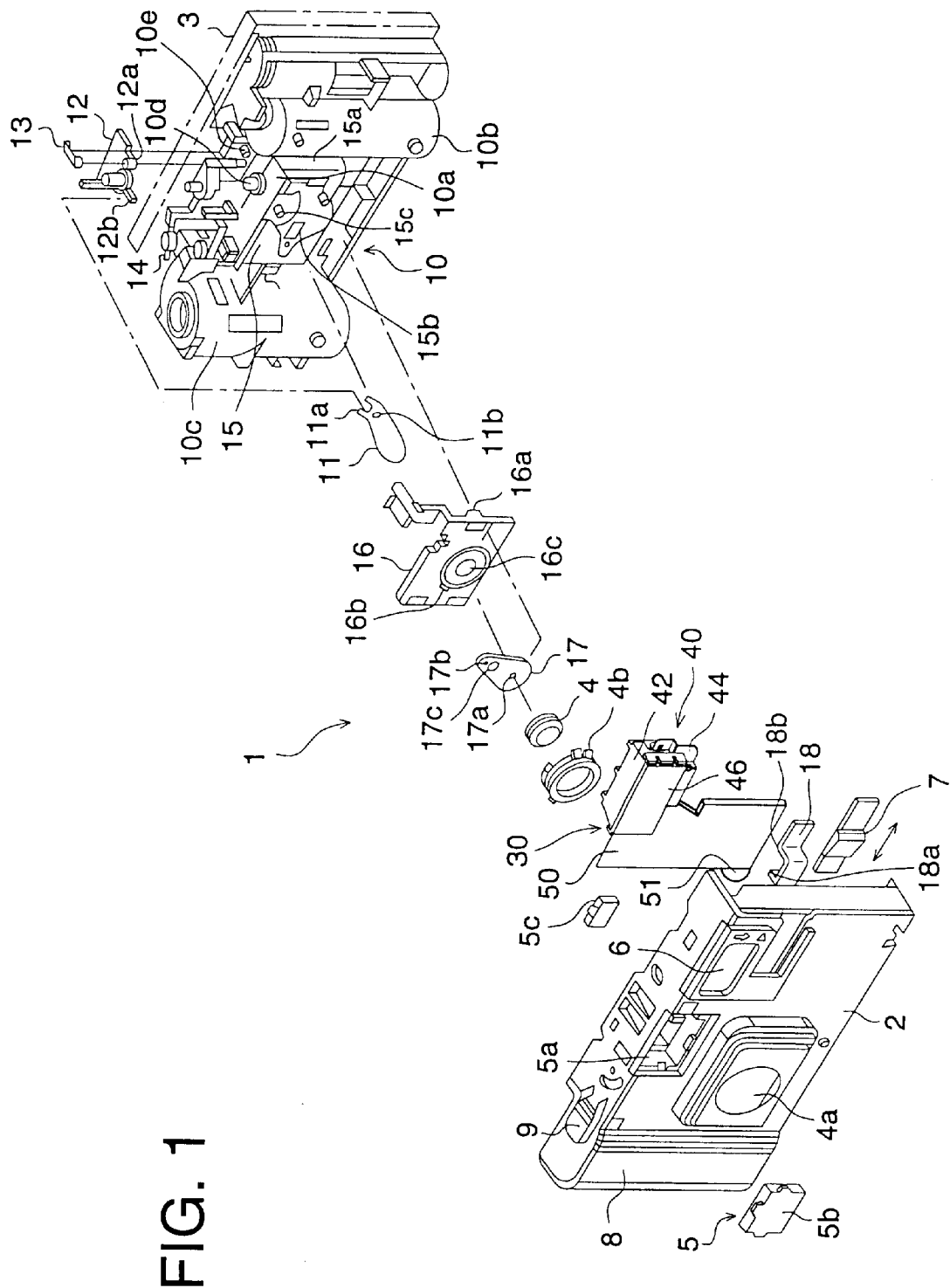
FIG. 1 is an exploded perspective view showing the structure of a lens-fitted film unit according to the embodiment 1 of the present invention.

Hereinafter, referring to the drawings, an embodiment of the present invention will be detailed.

Embodiment 1

Figure 2:
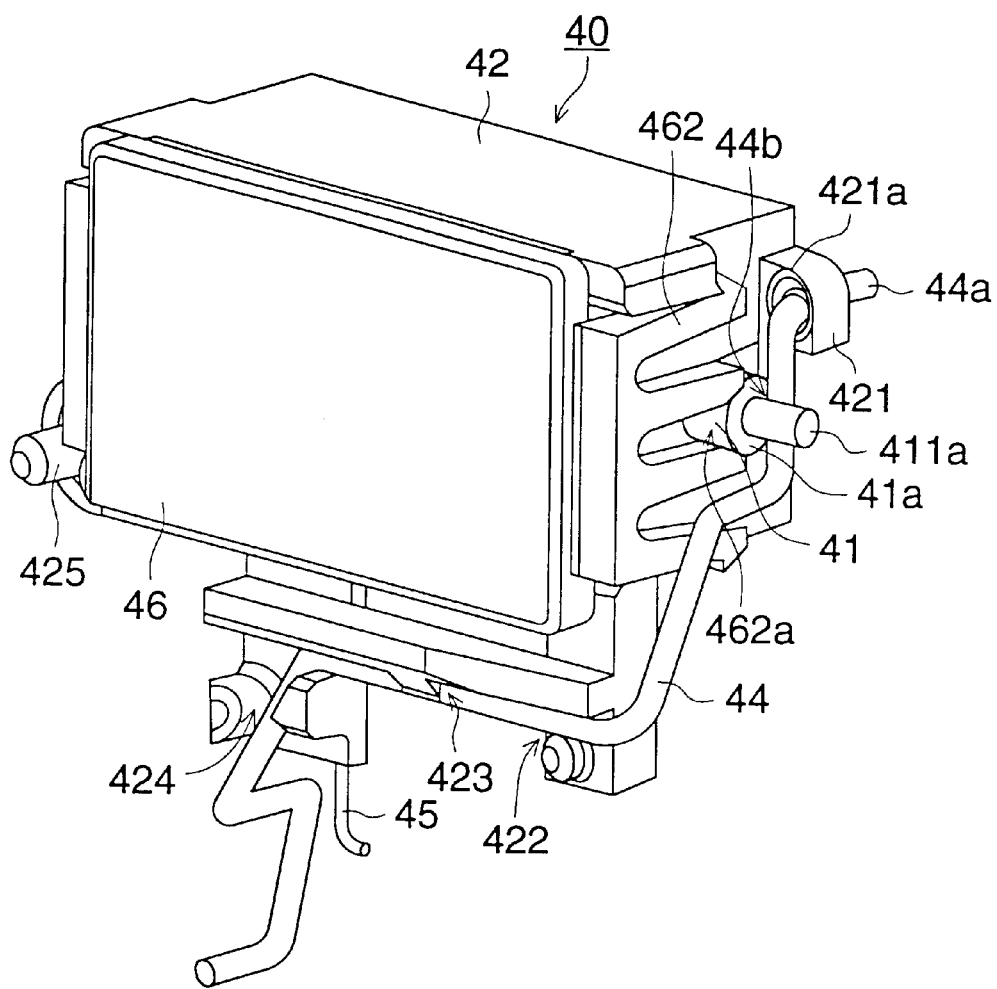
FIG. 2 is a perspective view in which the light emission section unit constituting the strobe device of the embodiment 1 is viewed from the front side.
Figure 3:
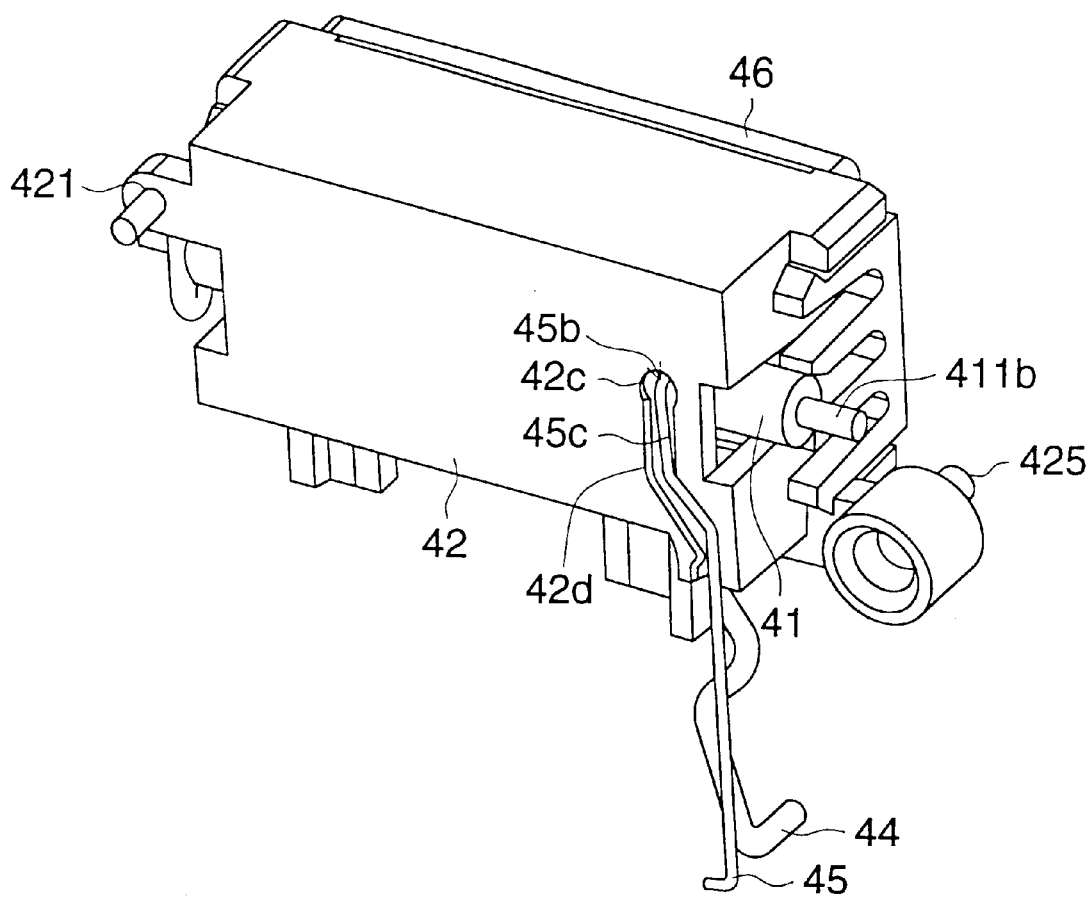
FIG. 3 is a perspective view in which the light emission section unit is viewed from the rear side.
Figure 4:
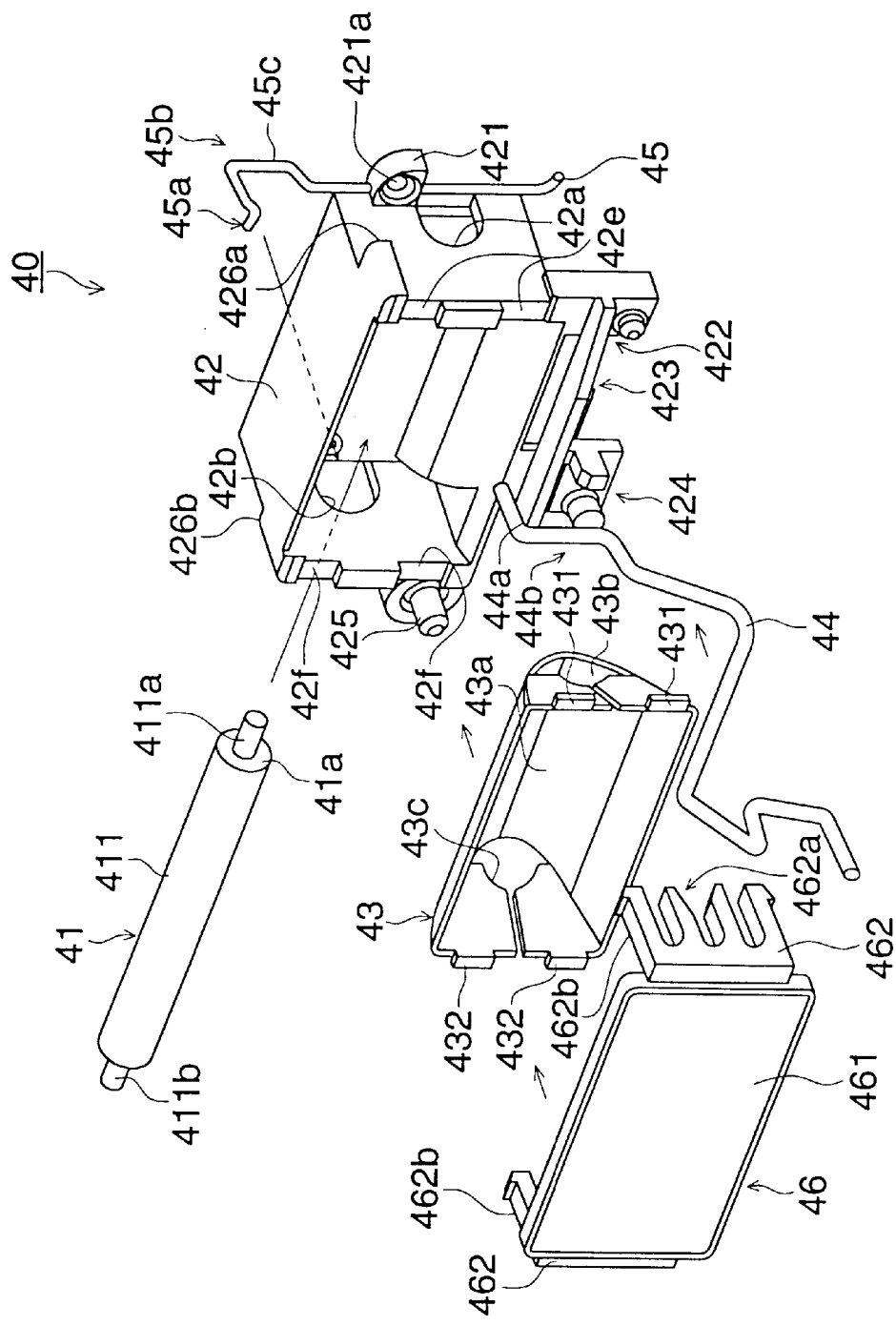
FIG. 4 is an exploded perspective view in which the light emission section unit is resolved and viewed from the front side.
Figure 5:
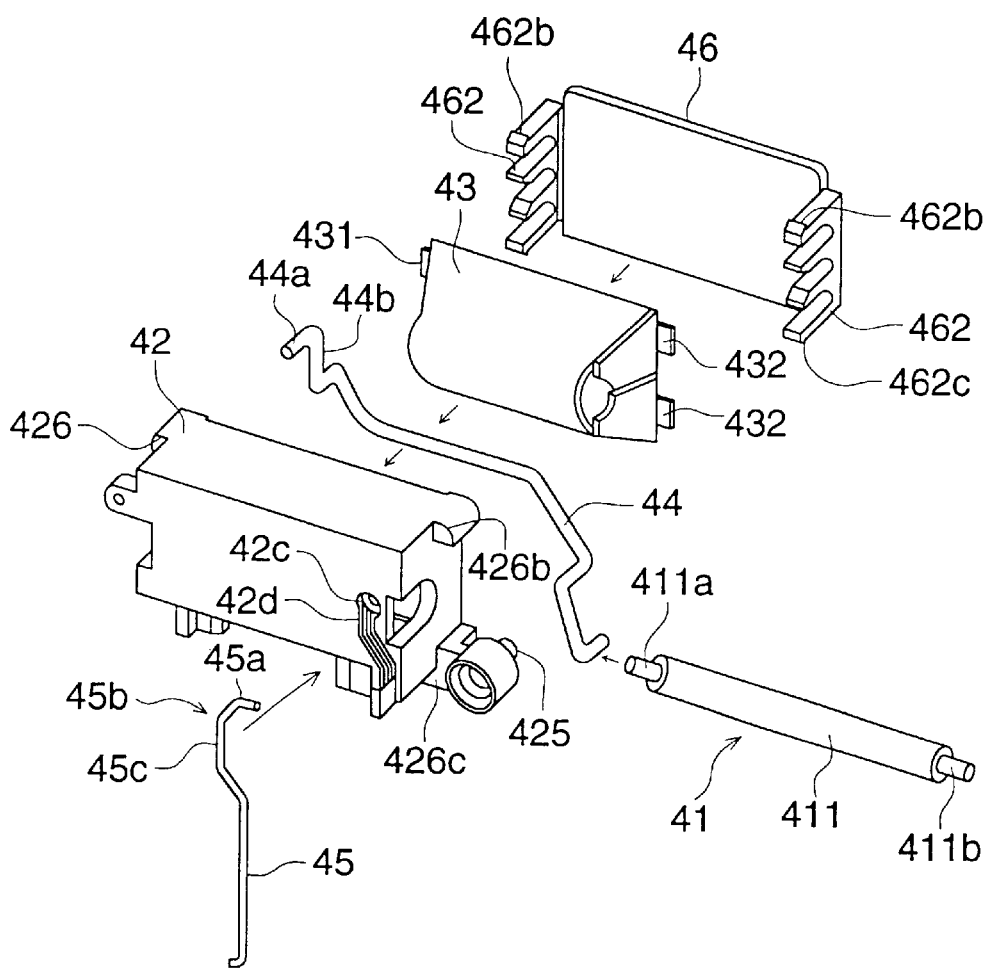
FIG. 5 is an exploded perspective view in which the light emission section unit is resolved and viewed from the rear side.
Figure 6:
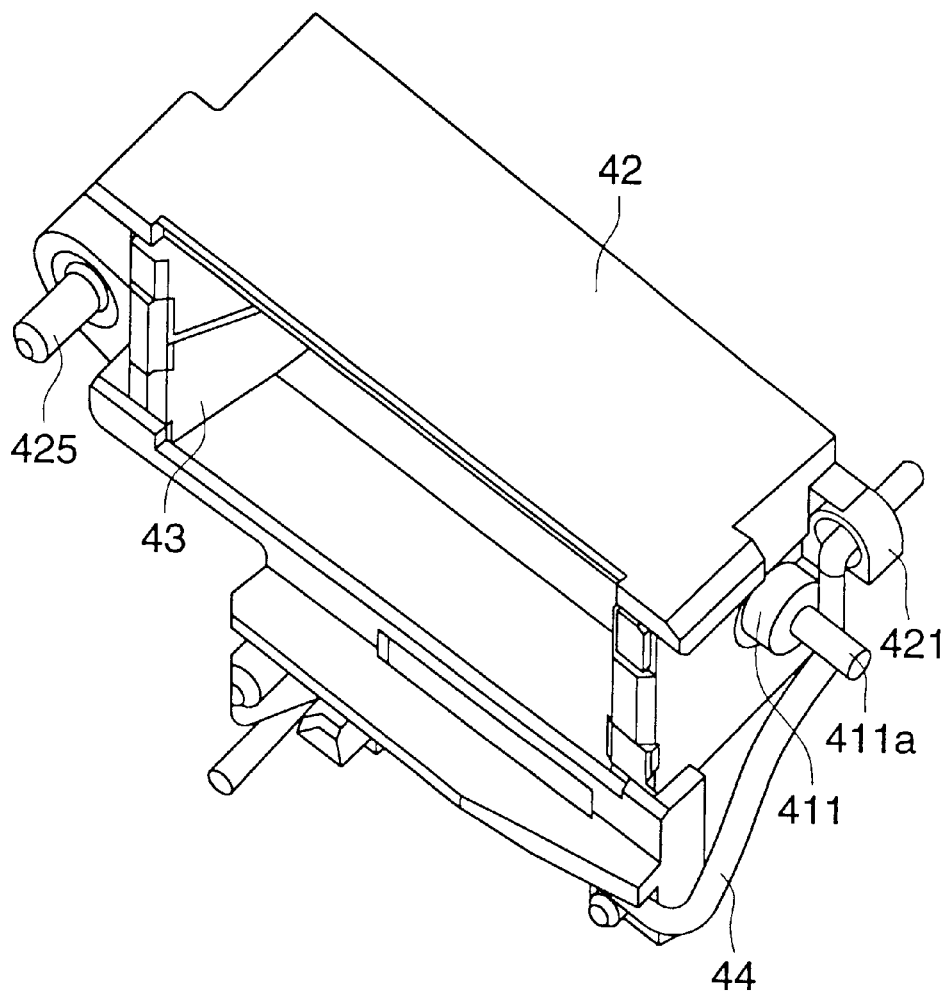
FIG. 6 is a perspective view showing the light emission section unit excluding a transmission window section.
Figure 7:
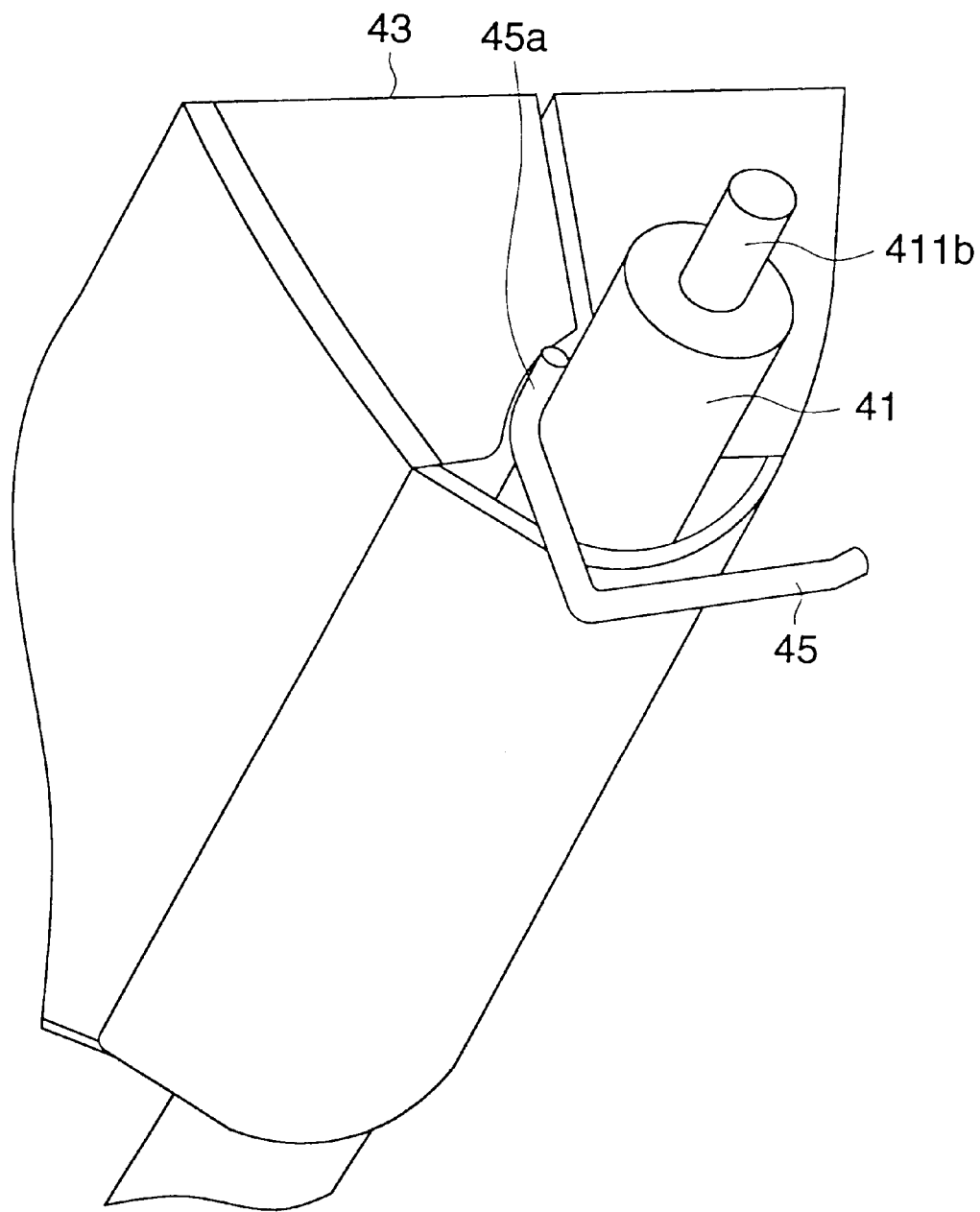
FIG. 7 is a perspective view showing the situation that the strobe light emitting tube constituting the light emission section unit is held by a reflector, and a connecting conductor for a trigger electrode is connected.
Figure 8:
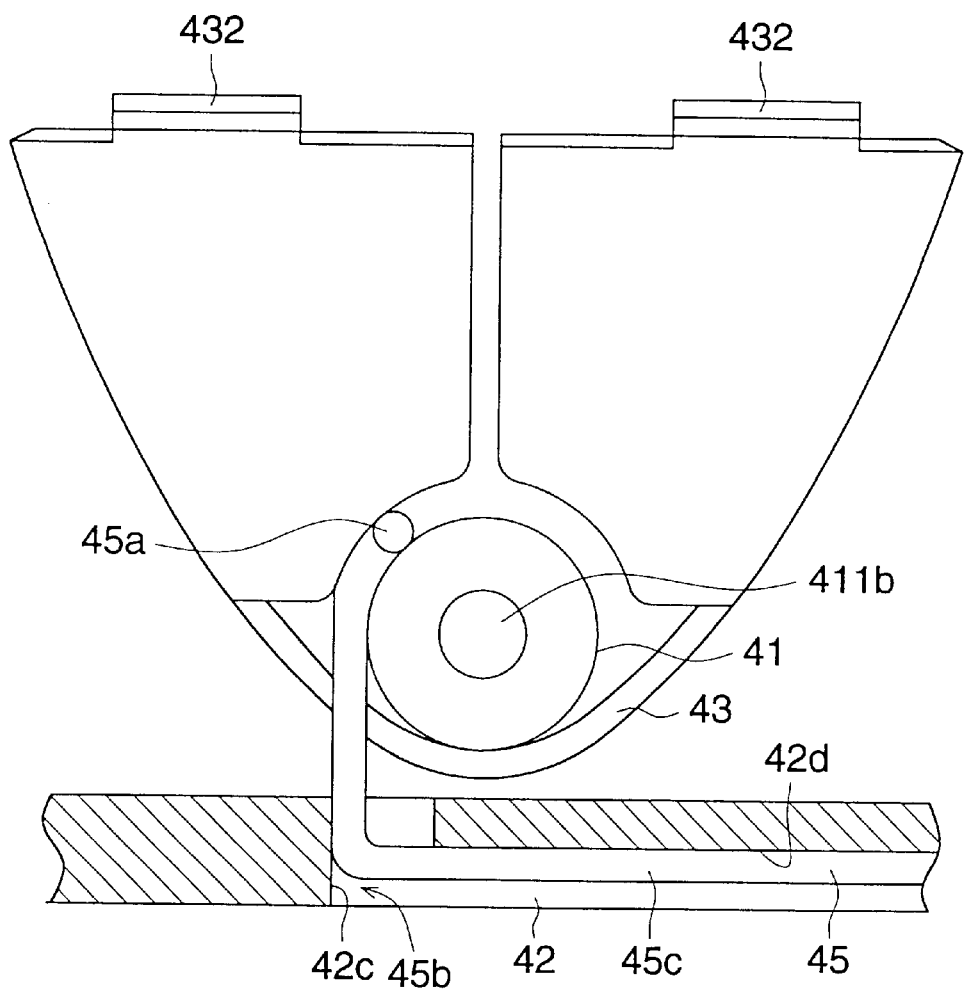
FIG. 8 is an illustration for explaining the attaching method of the connecting conductor for the trigger electrode.
Figure 9:
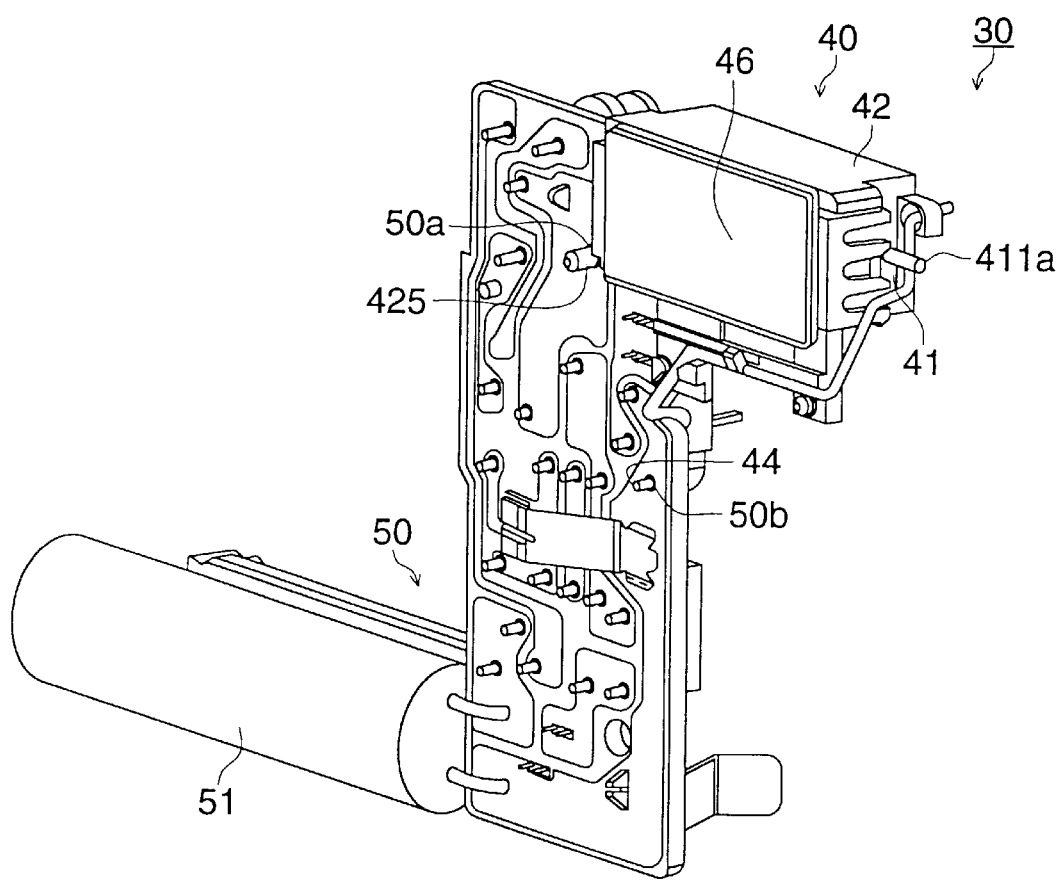
FIG. 9 is a perspective view viewed from the front side of the light emission section unit showing the structure of the strobe device.
Figure 10:
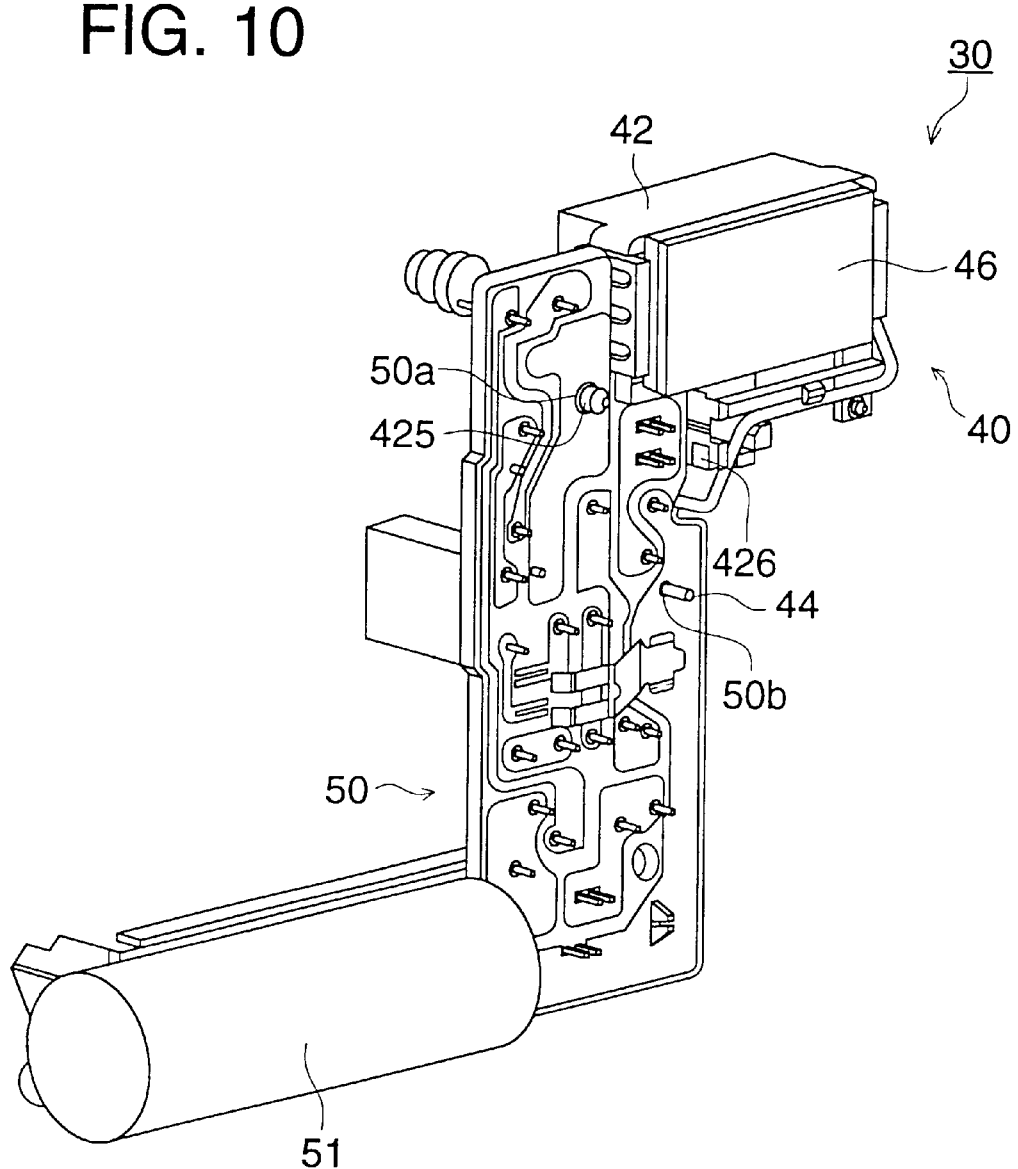
FIG. 10 is a perspective view viewed from the front side of the light emission section unit, showing the structure of the strobe device.
Figure 11:
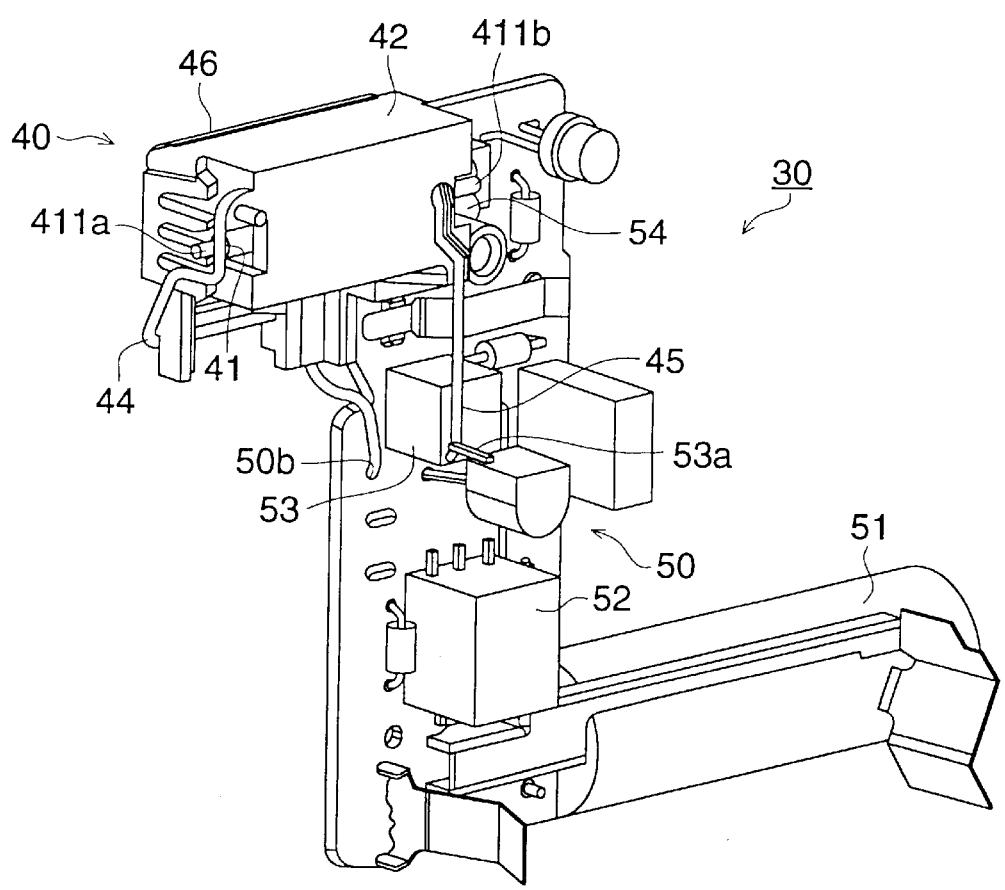
FIG. 11 is a perspective view viewed from the rear side of the light emission section unit, showing the structure of the strobe device.
Figure 12:
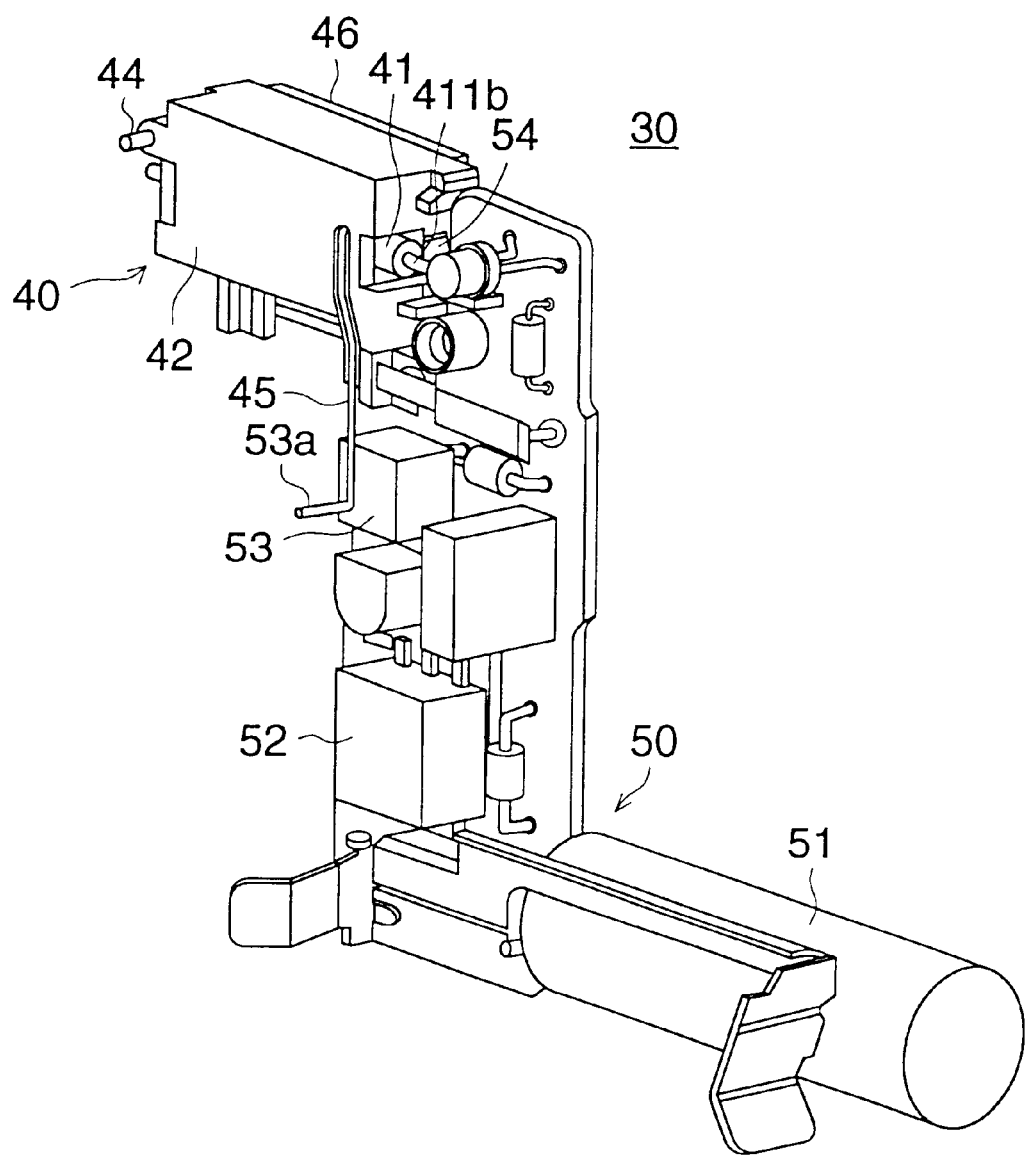
FIG. 12 is a perspective view viewed from the rear side of the light emission section unit, showing the structure of the strobe device.
Figure 13:
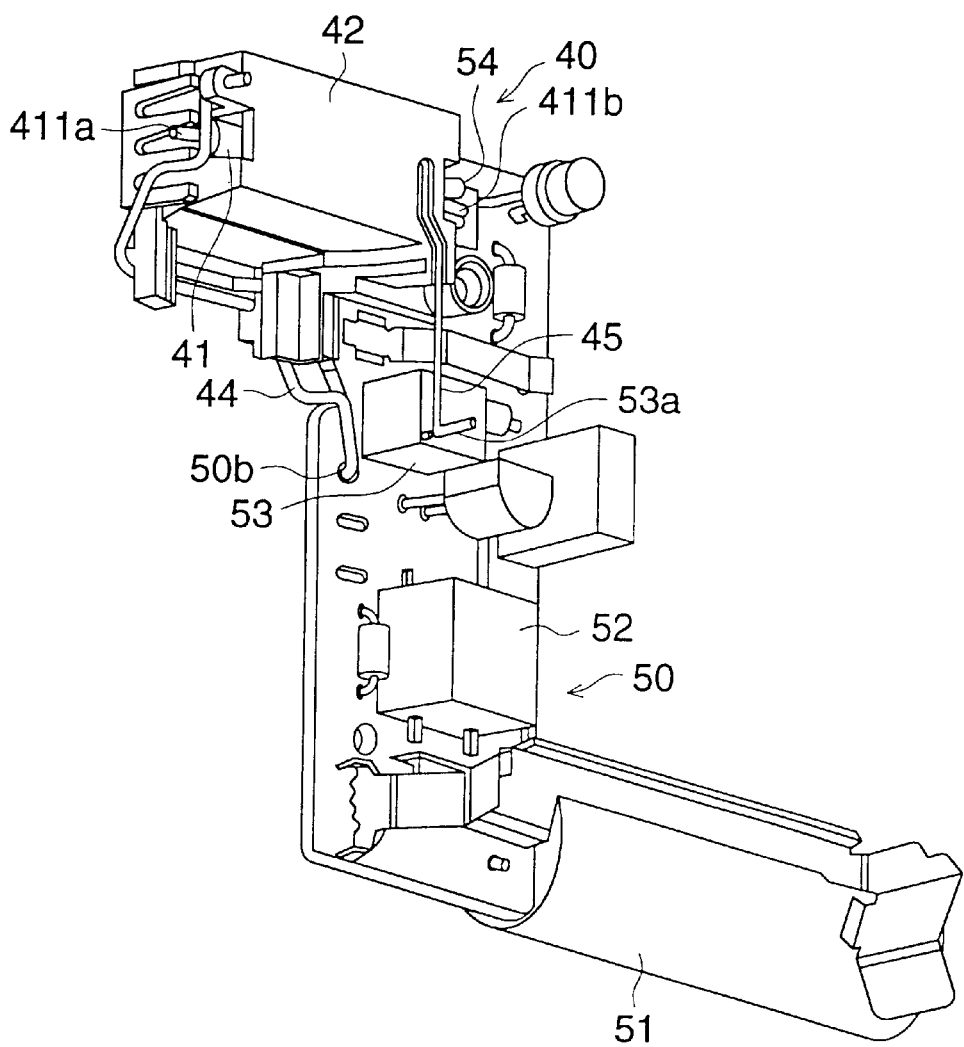
FIG. 13 is a perspective view viewed from the rear side of the light emission section unit, showing the structure of the strobe device.
Figure 14:
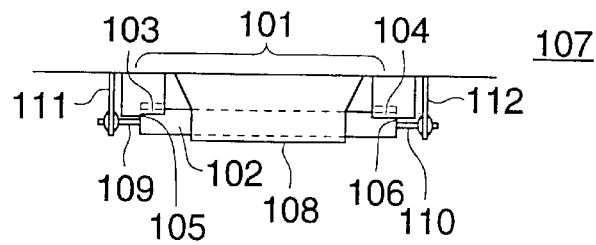
Figure 14:
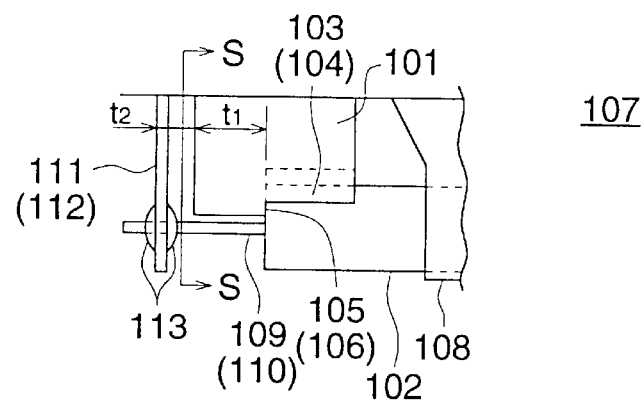
Figure 14:
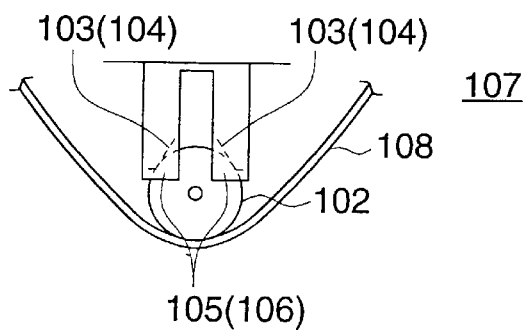
Figure 15:
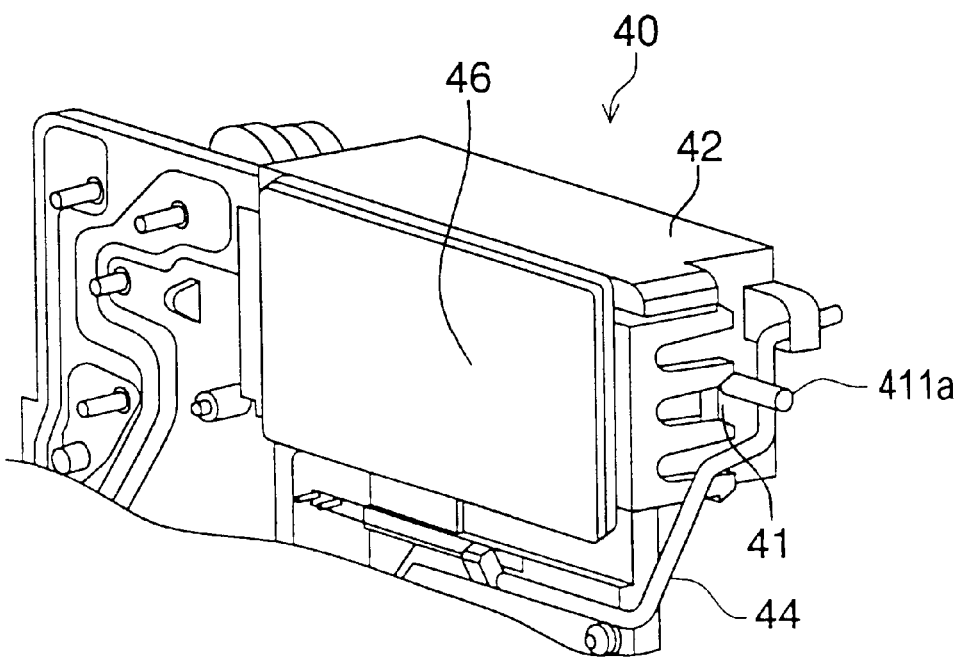
FIG. 15 is a partial perspective view of the light emission section unit of the embodiment of the present invention.

FIG. 1 is an exploded perspective view showing the structure of a lens-fitted film unit according to the embodiment 1 of the present invention. FIG. 2 is a perspective view in which the light emission section unit constituting the strobe device of the embodiment 1 is viewed from the front side. FIG. 3 is a perspective view in which the light emission section unit is viewed from the rear side. FIG. 4 is an exploded perspective view in which the light emission section unit is resolved and viewed from the front side. FIG. 5 is an exploded perspective view in which the light emission section unit is resolved and viewed from the rear side. FIG. 6 is a perspective view showing the light emission section unit excluding a transmission window section. FIG. 7 is a perspective view showing the situation that the strobe light emitting tube constituting the light emission section unit is held by a reflector, and a connecting conductor for a trigger electrode is connected. FIG. 8 is an illustration for explaining the attaching method of the connecting conductor for the trigger electrode. FIGS. 9 and 10 are perspective views viewed from the front side of the light emission section unit, showing the structure of the strobe device. FIGS. 11, 12 and 13 are perspective views viewed from the rear side of the light emission section unit, showing the structure of the strobe device.

The lens-fitted film unit 1 according to this Embodiment 1 is a simple camera which is placed into the market in the situation that the film is previously loaded in the camera, and a photographic film is loaded in a assembling process of the camera, and the camera is structured such that it is not necessary for the operator to load his photographic film or to rewind that, and the operator can conduct the photographic operation at once.

This lens-fitted film unit 1 is structured such that, as shown in FIG. 1, a front cover 2 and a rear cover 3 are assembled, and a picture-taking lens hole 4a is provided at the center of the front side of the front cover 2, and a view finder 5 composed of a finder frame 5a, objective lens 5b and ocular eyepiece 5c, is provided at the upper position of the picture-taking lens hole 4a, and a strobe light emitting window frame 6 is provided in the vicinity of the view finder 5.

Below the strobe light emitting window frame 6, a strobe lever switch 7 which is a switching lever, is provided, and the strobe lever switch 7 switches a strobe device 30, which will be described later, to in-use condition and not-use condition.

A grip portion 8 is provided on the right side portion of the lens-fitted film unit 1, and a release button 9 is provided on the upper portion of the grip portion 8.

As shown in FIG. 1, a main body 10 is provided in the inner portion sandwiched between the front cover 2 and the rear cover 3 of the lens-fitted film unit 1.

A picture-taking frame 10a is provided at the center of the main body, and a film accommodation chamber 10b is provided on one side and a winding chamber 10c is provided on the other side with the picture-taking frame 10a between them.

A boss 10d is provided on the upper portion of the main body 10, and a sector lever 12 to drive a sector 11 is attached to the boss 10d so that the sector lever 12 can be rotated. A spring 13 is provided between an engagement portion 12a of the sector lever 12 and a protrusion 10e of the main body 10, and by the spring 13, the sector lever 12 is always forced toward the close direction.

A boss 12b of the sector lever 12 is engaged with a U-shaped groove 11a of the sector 11, and transmits the movement of the sector lever 12 to the sector 11.

The sector lever 12 is rotated by a release mechanism 14 assembled in the main body, and the release mechanism 14 is operated by a release button 9.

A spacer 15 is provided on the front side of the picture-taking frame 10a of the main body 10, and on the front side of the spacer 15, a lens receiver 16 is provided such that a claw portion 16a is engaged with a recessed portion 15a of the spacer 15. An exposure window 15b is formed on the spacer 15, and the sector 11 is arranged between the spacer 15 and the lens receiver 16.

The sector 11 engages its hole 11b onto the boss 15c of the spacer 15, and is operated by the sector lever 12 so that the exposure window 15b can be opened.

In the lens receiver 16, the picture-taking lens 4 is assembled at a lens mounting portion 16b, and an exposure hole 16c is formed at a position corresponding to the picture-taking lens 4.

On the lens receiver 16, a stop plate 17 is set. In the stop plate 17, a stop hole 17a is formed, and by engaging an attaching hole 17b formed in the stop plate 17 with a boss provided on the spacer 15, the stop plate 17 is supported by the spacer 15 so that it can be rotated.

In the stop plate 17, a long hole 17c is formed, and the a protruded portion 18a of a slide lever 18 is engaged in the long hole 17c, and further, a stopper portion 18b is formed on the slide lever 18.

A strobe switch lever 7 is engaged with the slide lever 18. Incidentally, in FIG. 1, numeral 4b is a lens suppresser.

As shown in FIG. 1, a light emission section unit (a flash light emitting device) 40, which is a strobe light emission section, is attached to a strobe circuit board 50, and in this situation, a strobe device 30 is assembled being sandwiched between the main body 10 and the front cover 2.

As shown in FIG. 2 to FIG. 13, the light emission section unit 40 is provided with a strobe light emitting tube (light emitting tube) 41, strobe accommodation section 42, reflector 43, connecting conductor 44 which electrically conducts to one electrode bar (electrode terminal) of the strobe light emitting tube 41, connecting conductor 45 for a trigger electrode, and transmission window section 46 to transmit the strobe light.

The strobe light emitting tube 41 is composed of, for example, a xenon lamp which is formed into straight tube-like, and on both end portions of the light emitting tube main body 411, electrode bars 411a and 411b are attached.

Further, the surface of the light emitting tube main body 411 is covered by a conductive film. Incidentally, it is preferable that the transparency of the conductive film is as higher as possible.

The strobe accommodation portion 42 as reflector cover member is structured as follows: it is structured into almost box like having an opening on the front side; the strobe light emitting tube 41 and the reflector 43 are accommodated inside; through holes 42a, 42b in which the strobe light emitting tube 41 is inserted, are formed on the side wall portions of both sides; a through hole 42c through which the leading edge portion of the connecting conductor 45 is inserted, and a groove portion 42d which guides the linear line portion on the center portion side and buries it, are formed on the rear surface side; and a conductor holding portion 421 which holds and fixes the connecting conductor 44 by engaging the leading edge portion of the connecting conductor 44 into an engagement hole 421a is provided in the vicinity of the through hole 42a; and further, the strobe accommodation portion 42 is provided with conductor holding portions 422, 423, and 424 which hold and reinforce the intermediate portion of the connecting conductor 44, and further, has a positioning pin 425 and an engagement claw 426 by which the light emission section unit 40 is attached onto the strobe circuit board 50.

Incidentally, as shown in FIG. 3 or the other, it is preferable that the groove portion 42d has a curved portion. Because the leading edge portion 45a of the connecting conductor 45 is brought into contact with a predetermined portion on the outer peripheral surface of the light emitting tube main body 411 in the pressure contact condition, even when the vicinity of the corner portion of a bending portion 45b of the connecting conductor 45 is pushed to a side wall surface of the trough hole 42c, because the groove portion is bent, it can be prevented that the connecting conductor 45 is lifted out of the groove 42d.

Further, the engagement hole 421a is not provided, and the leading edge portion of the connecting conductor 44 is not also necessary to be fitted in.

Herein, the conductor holding section 422 positions the connecting conductor 44 in upper and lower directions and fixes it, by holding the connecting conductor 44 in the groove portion.

Further, the conductor holding section 423 has a claw portion for slip-out prevention, and the connecting conductor 44 is engaged and positioned in the front and rear directions and fixed.

Further, the conductor holding section 424 positions the connecting conductor 44 in the left and right directions and fixes it by holding the connecting conductor 44 in the groove portion.

The reflector 43 has a reflection portion 43a in which a parabolic reflection surface to reflect the strobe light toward the front is formed in the inner surface, and protruded pieces 431, 431, 432, and 432 by which the reflector 43 is attached to the strobe accommodation section 42, and inserting sections 43b and 43c through which the strobe light emitting tube 41 is inserted, are provided on both side wall sections.

Incidentally, the section of the wire member as the connecting conductor is preferably circle, elliptic, hexangular or quadrangular. Further, a diameter of the wire member is preferably 0.3 mm–1.0 mm. Further, the wire member is preferably formed of a metallic simple substance. Further, the material of the wire member is preferably selected from phosphor bronze, piano wire, stainless steel, aluminum alloy and brass. Further, when the wire member is deformed into the predetermined shape, it is preferable that the shape after the deformation of the wire member itself can be kept. Further, it is possible to obtain the wire member by cutting a material after forming its shape.

In the present embodiment, connecting conductors 44 and 45 are structured such that: both have the predetermined rigidity; for example, a phosphor bronze wire member is bent and formed into a predetermined form; and the diameter of the connecting conductor 44 is about 0.6 mm–1.0 mm, and that of the connecting conductor 45 is about 0.3 mm–0.5 mm.

The leading edge portion 44a of the connecting conductor 44 is engaged in the engagement hole 421a and held, and the connecting conductor 44 is provided with a positioning section 44b which has, in the vicinity of the leading edge portion, a portion which is brought into contact with one side end surface 41a of the strobe light emitting tube 41 and positions the length side of the strobe light emitting tube 41, and a portion which is brought into contact with the electrode bar 411a from the rear surface side of the light emission section unit 40 and electrically connected to it.

The connecting conductor 45 is, as shown in FIG. 7 and FIG. 8, brought into contact with a predetermined portion of the outer peripheral surface of the light emitting tube main body 411 in the pressure contact condition at the leading edge portion 45a. Further, the vicinity of the corner portion of the bending portion 45b is pushed to the side wall surface of the through hole 42c, and the linear portion 45c of the central portion side of the bending portion 45b is pushed to the wall surface of the groove portion 42d respectively.

Incidentally, in FIG. 8, a area in which the connecting conductor 45 is buried in the wall portion of the rear surface of the strobe accommodation section 42, is shown in the situation that the area is cut along the wiring path of the connecting conductor 45.

Herein, the dimensional shape of the member is set such that, when the vicinity of the corner portion of the bending portion 45b of the connecting conductor 45 is pushed to the side wall surface of the through hole 42c, the leading edge portion 45a is strongly pressure-contacted with a predetermined portion of the outer peripheral surface of the light emitting tube main body 411.

The transmission window section 46 is provided with a transmission plate 461, and comb-like holder portions 462 and 462 provided from both side end portions of the transmission plate 461 to the rear surface side, and each holder portion 462 has: a holding and receiving portion 462a which holds the strobe light emitting tube 41, and positions it in the front and rear directions and fixes it, by elastically pressing the strobe light emitting tube 41 between the hold and receiving portion 462a and the bottom surface of the reflection portion 43a of the reflector 43 with the strobe light emitting tube 41 between them; and an engagement claw portion 462b which attaches the transmission window section 46 to the strobe accommodation section 42, by being engaged with protruded portions 426a and 426b provided on both side portions of the strobe accommodation section 42.

On the strobe circuit board 50, circuit parts such as a capacitor 51, oscillation transformer 52, trigger coil 53, or the like, are connected to a circuit pattern and installed. Further, on predetermined portions of the strobe circuit board 50, a connecting piece 54 by which the electrode bar 411b of the strobe light emitting tube 41 is received and held and which is contacted with and electrically connected to the electrode bar 411b, an engagement hole 50a with which the positioning pin 425 is engaged, and an inserting hole 50b into which the trailing edge portion of the connecting conductor 44 is inserted, are provided.

In order to assemble the light emission section unit 40, as shown in FIG. 4 and FIG. 5, initially, protruded portions 431 and 432 of the reflector 43 are engaged in corresponding cutout portions 42e and 42f of the strobe accommodation section 42, and the reflector 43 is accommodated in the strobe accommodation section 42.

Next, the leading edge portion 44a of the connecting conductor 44 is engaged in the engagement hole 421a of the conductor holding portion 421, and the intermediate portion is held by conductor holding portions 422, 423 and 424, and the connecting conductor 44 is fixed.

Herein, in the connecting conductor 44, its leading edge portion is fixed by the conductor holding portion 421, and its intermediate portion is positioned and fixed, respectively, in the upper and lower directions, in the front and the rear directions, and in the left and right directions, by the conductor holding portions 422, 423 and 424.

Next, the strobe light emitting tube 41 is inserted from the inserting hole 42b side, and accommodated in the strobe accommodation section 42. That is, the inserting hole 42b, inserting hole 43c, inserting hole 43b and inserting hole 42a are inserted by the strobe light emitting tube 41 in order, and the positioning portion 44b of the connecting conductor 44 which is previously provided is brought into contact with the end surface 41a, and the positioning in the length direction of the strobe light emitting tube 41 is conducted. The electrode bar 411a comes into contact with the connecting conductor 44 in the situation that the connecting conductor 44 is brought into contact with the end surface 41a.

Next, the transmission window section 46 is attached to the strobe accommodation section 42, and both end portions of the light emitting tube main body 411 are pushed while the holding and receiving portions 462a, 462a while these portions are being expanded such that the both end portions of the light emitting tube main body 411 are sandwiched between them, and further, the strobe light emitting tube 41 is sandwiched between the holding and receiving portion 462a and the bottom surface of the reflection portion 43a of the reflector 43 and elastically pushed. Thereby, the strobe light emitting tube 41 is positioned in the front and rear directions and fixed.

Herein, the transmission window section 46 is fixed by respectively engaging engagement claw portions 462b, 462b with the protruded portions 426a and 426b, and the engagement claw portion 462c with the protruded portion 426c.

Next, the connecting conductor 45 is attached such that the leading edge portion 45a is inserted from the inserting hole 42c, and the linear portion 45c is buried in the groove portion 42d, and is attached to the strobe accommodation section 42 from the rear surface side. In this case, the leading edge portion 45a is brought into contact with a predetermined portion on the outer peripheral surface of the light emitting tube 411, in the situation that the vicinity of the corner portion of the bending portion 45b is pushed to the side wall surface of the through hole 42c, and the linear portion 45c on the central portion side of the bending portion 45b is pushed to the wall surface of the groove portion 42d, respectively.

According to this, the connecting conductor 45 is fixed, and when the vicinity of the corner portion of the bending portion 45b is pushed to the side wall surface of the through hole 42c, the leading edge portion 45a is elastically pressure-contacted to a predetermined position of the outer peripheral surface of the light emitting tube main body 411.

Then, the connecting conductor 44 is soldered onto the electrode bar 411a at a predetermined position of the positioning portion 44b and electrically connected.

After that, thus made light emission section unit 40 is attached to the strobe circuit board 50. Initially, a positioning pin 425 is engaged in an engagement hole 50a of the strobe circuit board 50, and the light emission section unit 40 is fixed to the strobe circuit board 50 by being engaged by the engagement claw 426.

After the trailing edge portion of the connecting conductor 44 is inserted into an inserting hole 50b of the strobe circuit board 50, a wiring pattern on the rear surface is soldered and electrically connected. The electrode bar 411b is held by the connection piece 54 and soldered, and directly electrically connected to the strobe circuit board 50. Further, the trailing edge portion of the connecting conductor 45 is soldered onto the terminal 53a of the trigger coil 53 and electrically connected.

According to this, the strobe device 30 in which assembly has been completed, is assembled as shown in FIG. 1.

As described above, according to the present Embodiment 1, the conventional resin discharging tube receiver for positioning is disused, and because the connecting conductor 44 is used also for positioning function, the cost can be reduced by the reduction of the number of parts, and because the dimension in the length side of the light emission section unit can be shorter, thereby, the reduction of the size of the strobe device can be attained.

Further, the leading edge portion of the connecting conductor 44 is assuredly held and fixed by a conductor holding portion 421 provided in the strobe accommodation section 42, and the intermediate portion of the connecting conductor 44 is positioned respectively in the upper and lower directions, in the front and rear directions, and in the left and right directions, by conductor holding portions 422, 423 and 424, and is assuredly held and fixed, therefore, the connecting conductor 44 composed of the wire member is fixed at a predetermined position assuredly and in the situation that the strength is kept.

In this situation, the positioning portion 44b of the connecting conductor 44 comes into contact with one side end surface 41a of the strobe light emitting tube 41, thereby, the positioning in the length direction of the strobe light emitting tube 41 can be correctly and assuredly carried out. As described above, in the situation that the strobe light emitting tube 41 is positioned in the length direction, the strobe light emitting tube 41 is positioned also in the front and rear directions by the holder portions 462 and 462, and strongly fixed.

Further, in the situation that the connecting conductor 44 is in contact with the end surface 41a, the electrode bar 411a comes into contact with the connecting conductor 44, therefore, the electrode bar 411a can be assuredly connected by soldering, and the strobe light emitting tube 41 is strongly fixed by the holding portions 462 and 462, and the connecting conductor 44 is also assuredly and strongly fixed, therefore, a strong connection condition is kept.

Further, in the situation that the connecting conductor 45 is attached, the leading edge portion 45a is pushed to a predetermined portion of the outer peripheral surface of the light emitting tube main body 411, the vicinity of the corner portion of the bending portion 45b is pushed to the side wall surface of the through hole 42c, and the linear portion 45c on the central portion side of the bending portion 45b is pushed to the wall surface of the groove portion 42d, respectively, therefore, even when the outer force is applied from any direction, the connecting conductor 45 is assuredly fixed without being shaken.

Further, in the connecting conductor 45, the vicinity of the corner portion of the bending portion 45b is pushed to the side wall surface of the through hole 42c, thereby, the leading edge portion 45a of the connecting conductor 45 is elastically pressure-contacted to a predetermined position of the outer peripheral surface of the light emitting tube main body 411, thereby, the light emitting tube main body 411 can be assuredly triggered.

Further, both of the connecting conductor 44 and 45 are composed of wire members, the material cost and manufacturing cost can be suppressed, and because only small space is necessary for wiring, the more size reduction of the strobe device can be attained.

Further, the resin discharge tube receiver for positioning is disused, and the present embodiment is structured such that the heat hardly applies onto the resin parts in the case of soldering, therefore, the damage such as melting of parts due to mis-operation at soldering, can be prevented from occurring.

The embodiment of the present invention is detailed as described as above, however, the concrete structure is not limited to the present embodiment.

For example, in the above-described Embodiment 1, the case structured such that the connecting conductor 44 composed of the wire member is connected to only one electrode bar 411a of the strobe light emitting tube 41, and this connecting conductor 44 positions the strobe light emitting tube 41 in the length direction, is described, however, the connecting conductor composed of the wire member, may be connected to both of electrode bars 411a and 411b.

Incidentally, the strobe device of the present invention can be applied not only to the lens-fitted film unit, but also to the ordinary camera, and the camera can be produced by using this strobe device.

Further, for the timing of attachment of the wire member to the camera during its production, there are several ways possible: 1) soldering the wire member to the strobe light emitting portion before the strobe light emitting portion is attached to the strobe circuit board; 2) soldering the wire member to the strobe light emitting portion after the strobe light emitting portion is attached to the strobe circuit board; and 3) attaching the wire member as shown in FIG. 23.

Further, in order also to prevent mis-install of the polarity of the light emitting tube having the polarities of + and − at the assembly of the strobe device, the following structure is preferable. Referring to FIG. 15 through FIG. 18, that will be described below.

In the present embodiment, the light emission section unit 40 is provided with: the connecting conductor 44' which comes into contact with one electrode terminal (electrode bar) 411a of the light emitting tube 41, when the light emitting tube 41 is assembled in the strobe accommodation section 42; the connecting conductor 44" which comes into contact with the other electrode terminal (electrode bar) 411b of the light emitting tube 41; the connecting conductor 45 which comes into contact with the tube surface (trigger electrode) of the light emitting tube 41; and the transmission window section 46 which transmits the strobe light from the light emitting tube 41.

That is, the light emitting tube 41 is connected to the print board 21 through the connecting conductors 44' and 44", and the connecting conductor 45, and the strobe circuit is formed.

The connecting conductors 44', 44" and 45 are formed such that, for example, phosphorous bronze wire members both having the predetermined rigidity are bent and formed into the predetermined shape, and respectively have, for example, about 0.6 mm–1.0 mm, and about 0.3 mm–0.5 mm diameters.

The light emitting tube 41 is composed of, for example, a xenon lamp which is formed into straight tube-like, and in the present Embodiment 2, the dimensions of one electrode terminal 41a and the other electrode terminal 41b are set as follows.

Figure 17:
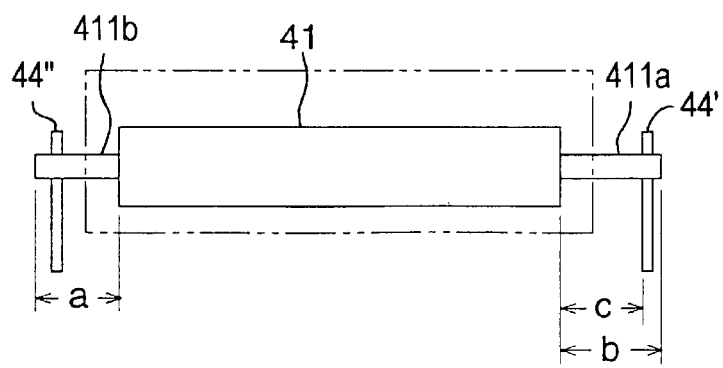
FIG. 17 is an illustration showing a dimensional relationship of terminals of the light emitting tube and the connecting conductor of the embodiment of the present invention.

That is, as shown in FIG. 17, when the length of one electrode terminal 411b of the light emitting tube 41 is defined as a, the length of the other electrode terminal 411a is defined as b, and the dimension from the end of the light emitting tube 41 on the other electrode terminal 411a side to the connecting conductor 44' which is a connection receiving section of the other electrode terminal 411a is defined as c, the dimensions are set such that the relationship a<c<b is established.

According to this, according to the difference of lengths of both electrode terminals 411a and 411b, even if there is no marking of the polarity of the light emitting tube 41, polarities of both electrode terminals 411a and 411b can be distinguished.

Furthermore, when both electrode terminals 411a and 411b of the light emitting tube 41 are arranged reversely and the light emitting tube 41 is assembled in the strobe accommodation section 42, because the length a of one electrode terminal 411b is smaller than the dimension c, one electrode terminal 411b does not reach the connecting conductor 44b. According to this, the assembly of electrode terminals 411a and 411b accompanied by erroneous polarity in the light emitting tube 41 can be prevented.

Figure 16:
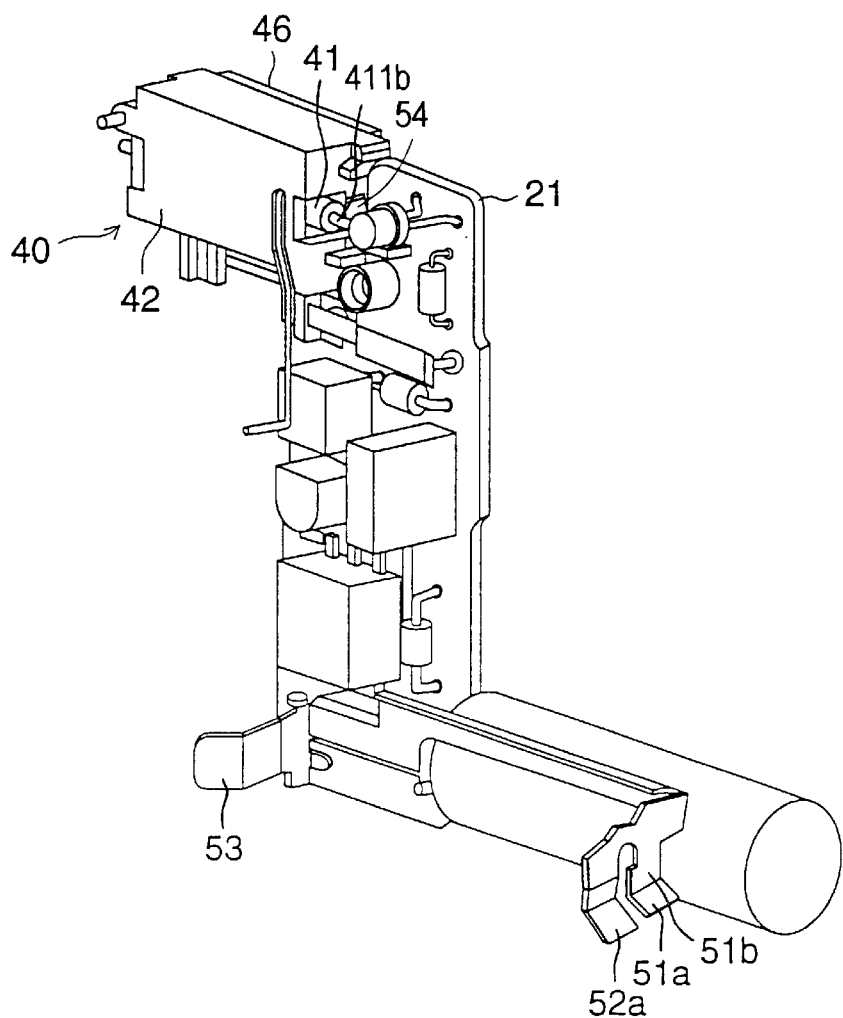
FIG. 16 is a perspective view of the strobe unit and a battery installation section of the embodiment of the present invention.
Figure 18:
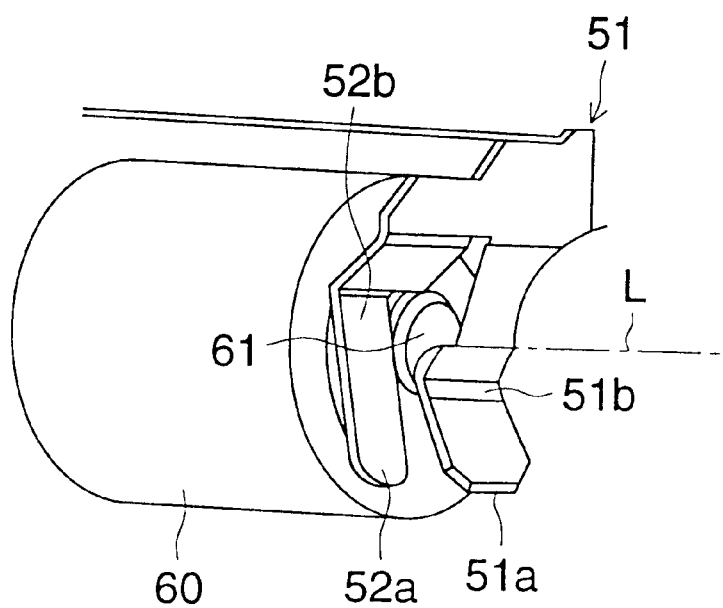
FIG. 18 is an enlargement view of a battery and a portion of an anode contact piece of the embodiment of the present invention.

Further, as shown in FIG. 18 and FIG. 16, the anode contact piece 51 contacting with the anode bar 61 of the battery 60 for operation which is inserted from the arrowed direction into the battery install section 50 composed of the anode contact piece 51 and cathode contact piece 53 formed by the elastic conductive member, may be formed into a fork-shape, composed of the first bending piece 51a with which the most protruded portion of the L-shaped bending portion 51b comes into contact at the position in the inserting direction form the center of the length direction (shown by the segment L) of the battery 60, with the end surface of the anode bar 61 of the battery 60, and the second bending piece 52a having the bending portion 52b contacting with the outside surface of the anode bar 61.

According to this structure, when the most protruded portion of the bending portion 51b comes into contact with the end surface of the anode bar 61 of the battery 60 with the elasticity, at the position on the inserting direction side form the center of the length direction of the battery 60, by the first bending piece 51a of the anode contact piece 51, the battery 60 can be prevented from slipping out to the inserting direction side.

Further, the first bending piece 51a and the second bending piece 52a are formed such that these are bent to the rear surface side direction of the board, however, when the anode bar 61 of the battery 60 comes into contact with the rear surface side (outside surface) of the board with elasticity and its position is regulated, by the second bending piece 52a, the anode bar of the battery 60 can be prevented from slipping out to the rear surface side (outside surface) of the board.

Figure 19:
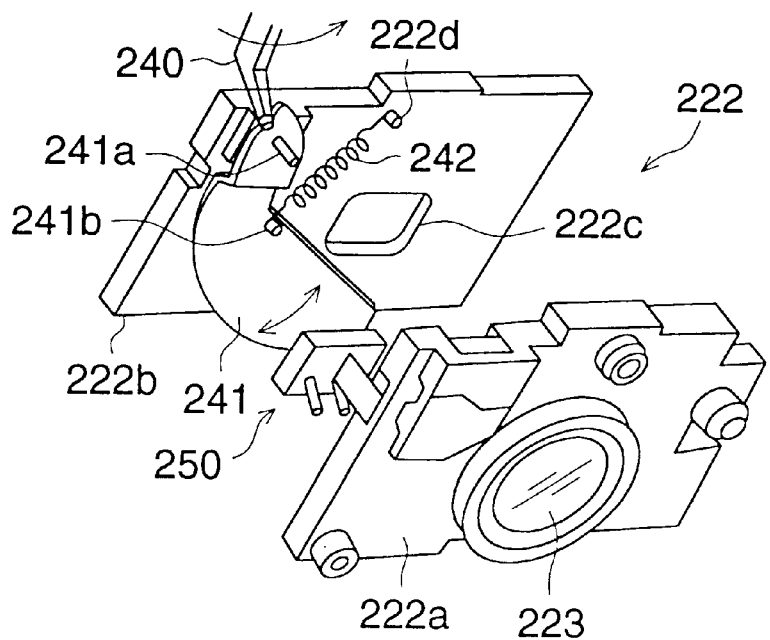
FIG. 19 is a view resolving and showing a lens holder 222.

Further, the lens-fitted film unit may have the following structure. FIG. 19 is a view showing a lens holder 222 which is resolved. In FIG. 19, the lens holder 222 is structured by a front side member 222a as a holding member, and a rear side member 222b, and has a sector blade 241 between them. A picture taking lens 223 is arranged at the center of the front member 222a, and on the one hand, an exposure opening 222c is formed at a position corresponding to the picture taking lens 223 at the center of the rear side member 222b.

Figure 20:
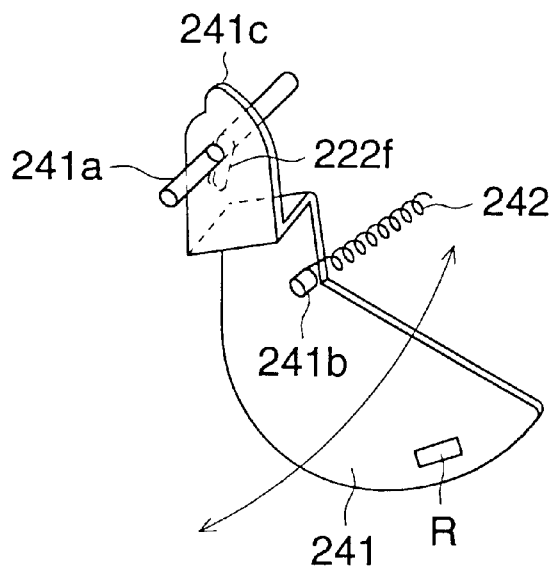
FIG. 20 is a perspective view enlarging and showing a sector blade 241.

FIG. 20 is a perspective view showing the sector blade 241 which is enlarged. In FIG. 20, the resin sector blade 241 has the shape in which a sheet of thin plate is bent to crank-shape, and on its upper end, a protruded portion 241c as an input section is formed. On the lower portion of the protruded portion 241c, a pair of bosses 241a which are cylindrical protruded portions, are oppositely extended from both surfaces of the sector blade 241 to its vertical direction. One boss 241a is engaged with a long hole 222f as a recessed portion formed on the rear side member 222b, and the other boss 241a is engaged with a long hole (not shown) as a recessed portion formed on the front side member 222a.

Further, a cylindrical portion 241b to fit one end of the spring member 242 is formed at the center of the sector blade 241. The other end of the spring member 242, as shown in FIG. 19, is fitted to a cylindrical portion 222d provided at the upper portion of the rear side member 222b. Accordingly, the sector blade 241 is forced to rotate to the counterclockwise direction around the boss 241a by a spring member 242 in the assembled condition, and accordingly, shields an exposure opening 222c (in a shielding position). In this case, the boss 241a is moved to the upper end of the long hole 222f and held by the urging force of the spring member 242 (refer to FIG. 20). Incidentally, in FIG. 19, for easy understanding of the operation, a condition that a charge lever 240 drives the sector blade 241 (in the opened position), is shown. On the lower portion of the sector blade 241, a reflector R as a reflection portion made of a high reflectance member, is adhered.

Figure 21:
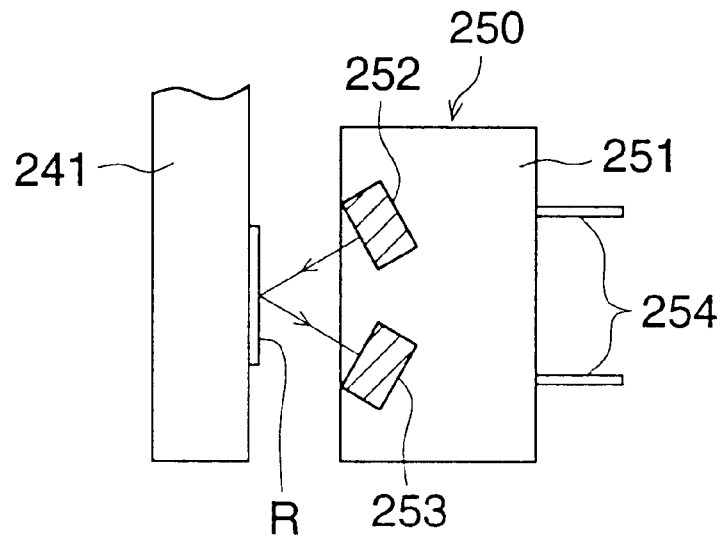
FIG. 21 is a view showing a sensor device proximately arranged below the sector blade 241.
Figure 21:
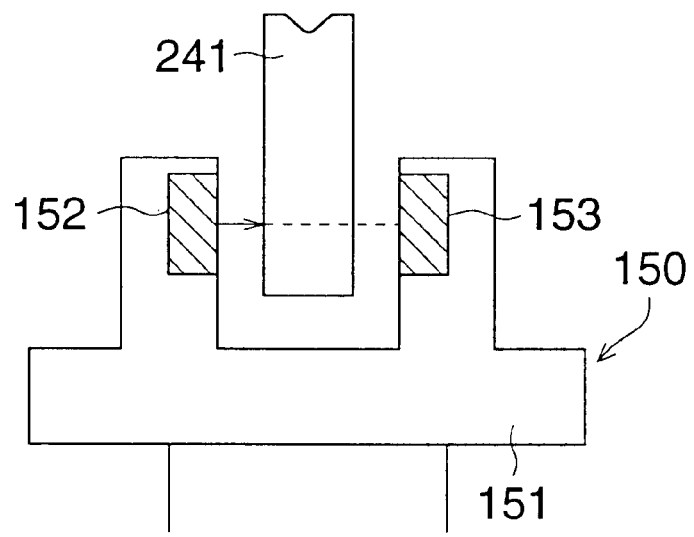

FIG. 21 is a view showing a sensor apparatus proximately arranged at the lower portion of the sector blade 241. In FIG. 21(a), the sensor apparatus 250 is structured by a sensor case 251 oppositely formed to the sector blade 241, a light emitting element 252 as a light source to emit the detection light, and a light receiving element 253 to receive the detection light, which are respectively attached in the sensor case 251. Incidentally, leads 254 to transmit the trigger signal extend from the rear surface of the sensor case 251.

Operations of the sector blade 241 will be described. Initially, by winding a winding knob, a charge lever 240 is moved to the left, and in this case, the leading edge of the charge lever 240 comes into contact with the protruded portion 241c of the sector blade 241. However, because the boss 241a of the sector blade 241 is supported so as to be movable in the length direction of a long hole by a long hole 222f of the front side member 222a and the rear side member 222b, even if the leading edge of the charge lever 240 comes into contact with the protruded portion 241c, the sector blade 241 is only moved to the length direction of the long hole (lower direction) against the urging force of the spring member 242, and does not open the exposure opening 222c. Accordingly, in this case, the reflector R of the sector blade 241 does not reach the front of the light emitting element 252 and the light receiving element 253, therefore, the light receiving element 253 does not receive the detection light.

Opposite to this, when the release mechanism 239 is operated corresponding to the pressing-pressure of the release button (not shown) and charge lever 240 is quickly moved to the right direction, its leading edge collides with the protruded portion 241c, and by the impact generated at the time, the sector blade 241 is rotated clockwise against the urging force of the spring member 242 and moved to the open position, and opens the exposure opening 222c. Next, when the leading edge of the charge lever 240 moves over the protruded portion 241c, the sector blade 241 is rotated counterclockwise by the urging force of the spring member 242 and is moved to the shield position, and shields the exposure opening 222c.

Incidentally, the reflector R of the sector blade 241 passes the front of the light emitting element (light emitting diode) 252 and the light receiving element (phototransistor) 253 together with the clockwise rotation of the sector blade 241, and the detection light emitted from the light emitting element 252 at this time is reflected by the reflector R, and this reflected light is received by the light receiving element 253. Corresponding to the light reception of the detection light by the light receiving element 253, the trigger signal is transmitted through leads 254, and the xenon tube emits the light through the strobe circuit, which will be described later.

Figure 22:
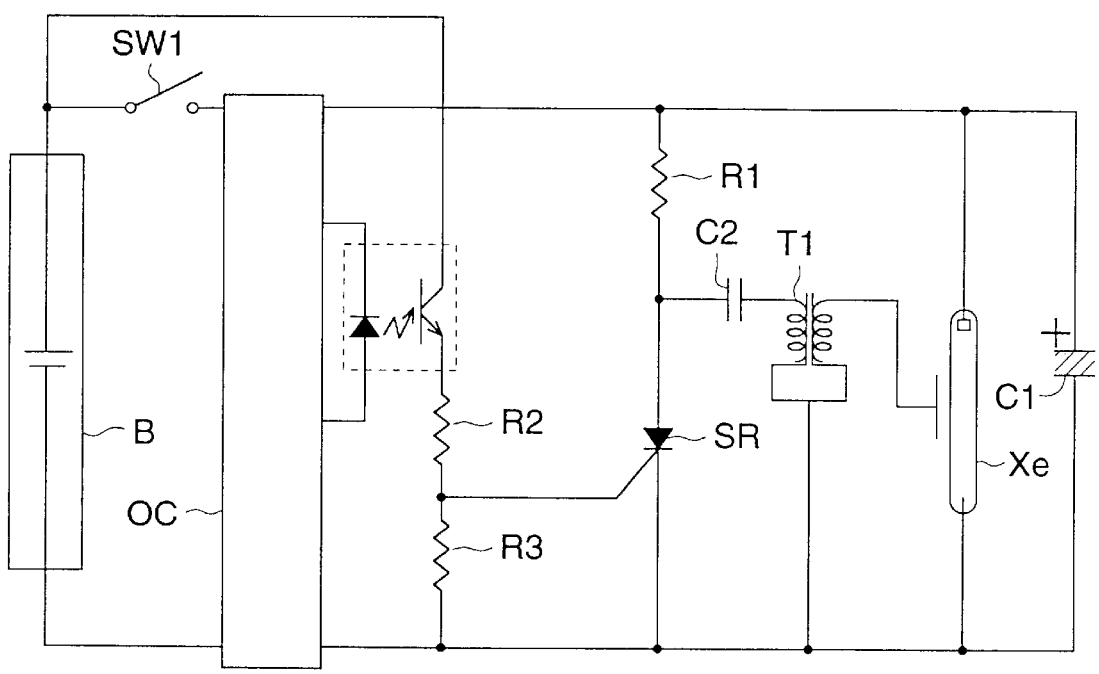
FIG. 22 is a circuit diagram of the strobe circuit according to the present embodiment.

FIG. 22 is a circuit diagram of a strobe circuit according to the present embodiment. The strobe circuit shown in FIG. 2 comprises: a power supply portion as a charging power supply, for example, a SUM-3 battery B; an oscillation circuit OC to step up the power supply voltage; an ON/OFF switch SW1 to control that the power supply voltage is supplied to the oscillation circuit OC or not; a light emission section, for example, a xenon tube Xe, to emit the light at the strobe picture-taking; a main capacitor C1 to accumulate the energy to make the Xe tube emit the light; a trigger capacitor C2 and a trigger coil T1 to generate the trigger voltage to excite the light emission; a sensor apparatus 250 to output the trigger signal corresponding to open and close (existence or not) of the sector blade 241; and a thyristor SR to open and close the electrical continuity between the trigger capacitor C2 and the trigger coil T1 corresponding to the trigger signal of the sensor apparatus 250.

Operations of the strobe circuit when the sensor apparatus 250 shown in FIG. 21(a) is used, will be described below. When, because the sector blade 241 does not exist on the side of the sensor apparatus 250, the detection light of the light emitting element 252 does not reach the light receiving element 253, the trigger signal is not transmitted from the light receiving element 253, therefore, the thyristor SR is off. Accordingly, the trigger capacitor C2 is not electrically continued to the trigger coil T1, and the Xe tube does not emit the light. On the one hand, when shutter release is conducted, and the sector blade 241 passes the side of the sensor apparatus 250, the detection light of the light emitting element 252 is reflected by the reflector R and reaches the light receiving element 253, and the trigger signal is transmitted from the light receiving element 253. Then, the potential difference is generated across the resistance R3 and the tyristor SR is turned on. Thereby, the trigger capacitor C2 and the trigger coil T1 are electrically continued, and the Xe tube emits the light, thereby, the strobe emission is conducted.

In the present embodiment, the light emitting element 252 and the light receiving element 253 are arranged at the upper and lower portions, and the detection light is detected by the reflector R provided on the sector blade 241. In contrast to this, in an example of variation (sensor apparatus 150) shown in FIG. 21(b), the light emitting element 152 and the light receiving element 153 are oppositely arranged, and when the sector blade 241 blocks the detection light from the light emitting element 152, the light receiving element 153 transmits the trigger signal. Operations of the strobe circuit when the trigger signal is transmitted, is the same as described above. In such the case, the sector blade 241 functions as a light shielding section. Incidentally, in the embodiment shown in FIG. 21(a), the reflector may be attached to a portion moving together with the sector blade (for example, the charge lever). Further, a non-contact type trigger switch using magnetism may be used.

As described above, according to the present embodiment, because a non-contact type trigger switch is adopted, an erroneous operation due to the wear or deformation of the trigger switch can be prevented, and the more assured strobe operation can be secured. Further, because an optical sensor is used as the trigger switch, the structure can be made compact.

As described above, according to the present invention, because the connecting conductor connected to the electrode terminal is composed of a wire member, the cost is low, and the strobe device which can intend to reduce the size, can be provided.

Further, because the connecting conductor is previously processed into a predetermined shape, for example, by holding it at a predetermined portion of the flush light emitting device, the connecting conductor is easily positioned and fixed.

Further, the connecting conductor can be assuredly fixed to the reflector covering member.

Further, positioning of the connecting conductor can be assuredly conducted, and the connecting conductor can be more assuredly fixed to the reflector covering member in the situation that its strength is kept.

Further, because the connecting conductor is used also for the function to position the light emitting tube, for example, an exclusive use member for positioning of the light emitting tube in the assembly direction, is not necessary, therefore, the cost can be reduced, and because the dimension in the assembly direction of the light emitting tube of the flash light emitting device can be reduced, the reduction of the size of the strobe device can be attained.

Further, the trigger connecting conductor can be assuredly fixed, and because the trigger connecting conductor is composed of a wire member, the cost is lower, and the strobe device which can attain the reduction of the size, can be provided.

Further, a production method of the strobe device in which the light emitting tube can be assuredly positioned by the minimum of members and strongly fixed, can be provided.

Disclosed embodiment can be varied by a skilled person without departing from the spirit and scope of the invention.

What is claimed is:

1. A camera in which unexposed film is previously loaded, comprising:
    a strobe circuit board;
    a strobe emitting portion including,
        a) a light emitting tube having electrode terminals on both ends thereof,
        b) a reflector for reflecting strobe light emitted by said light emitting tube toward a photographic object wherein said light emitting tube is placed at a predetermined position in relation to said reflector, and
        c) a transmission window for covering a front surface of said reflector and for transmitting said strobe light;
    a first connection receiving section for receiving one of said electrode terminals; and
    a second connection receiving section for receiving the other one of said electrode terminals,
    wherein said one of said electrode terminals is longer than the other one of said electrode terminals so that said light emitting tube is prevented from being assembled in other than a predetermined direction; and a length of said one of said electrode terminals is longer than a distance between the end of said light emitting tube on said one of said electrode terminals side and said first connection receiving section, and said distance between the end of said light emitting tube on said one of said electrode terminals side and said first connection receiving section is longer than a length of the other one of said electrode terminals.

2. The camera of claim 1 wherein said first and second connection receiving sections, supply electricity for said light emitting tube.

3. The camera of claim 1, wherein said strobe emitting portion further comprises a positioning means for placing said light emitting tube at said predetermined position.

4. A strobe device comprising:
   a strobe circuit board;
   a strobe emitting portion including,
      a) a light emitting tube having electrode terminals on both ends thereof,
      b) a reflector for reflecting strobe light emitted by said light emitting tube toward a photographic object wherein said light emitting tube is placed at a predetermined position in relation to said reflector, and
      c) a transmission window for covering a front surface of said reflector and for transmitting said strobe light;
   a first connection receiving section for receiving one of said electrode terminals; and
   a second connection receiving section for receiving the other one of said electrode terminals;
   wherein said one of said electrode terminals is longer than the other one of said electrode terminals so that said light emitting tube is prevented from being assembled in other than-a predetermined direction; and a length of said one of said electrode terminals is longer than a distance between the end of said light emitting tube on said one of said electrode terminals side and said first connection receiving section, and said distance between the end of said light emitting tube on said one of said electrode terminals side and said first connection receiving section is longer than a length of the other one of said electrode terminals.

5. The strobe device of claim 4 wherein said first and second connection receiving sections, supply electricity for said light emitting tube.

6. The strobe device of claim 4, wherein said strobe emitting portion further comprises a positioning means for placing said light emitting tube at said predetermined position.

* * * * *

UNITED STATES PATENT AND TRADEMARK OFFICE
CERTIFICATE OF CORRECTION

PATENT NO.    : 6,445,885 B2
DATED         : September 3, 2002
INVENTOR(S)   : H. Nakanishi et al.

It is certified that error appears in the above-identified patent and that said Letters Patent is hereby corrected as shown below:

Title page,
Item [30], Foreign Application Priority Data, in the last priority listed, cancel "9-153612" insert -- 11-153612 --

Signed and Sealed this

Fourth Day of February, 2003

JAMES E. ROGAN
*Director of the United States Patent and Trademark Office*